Figure 1:
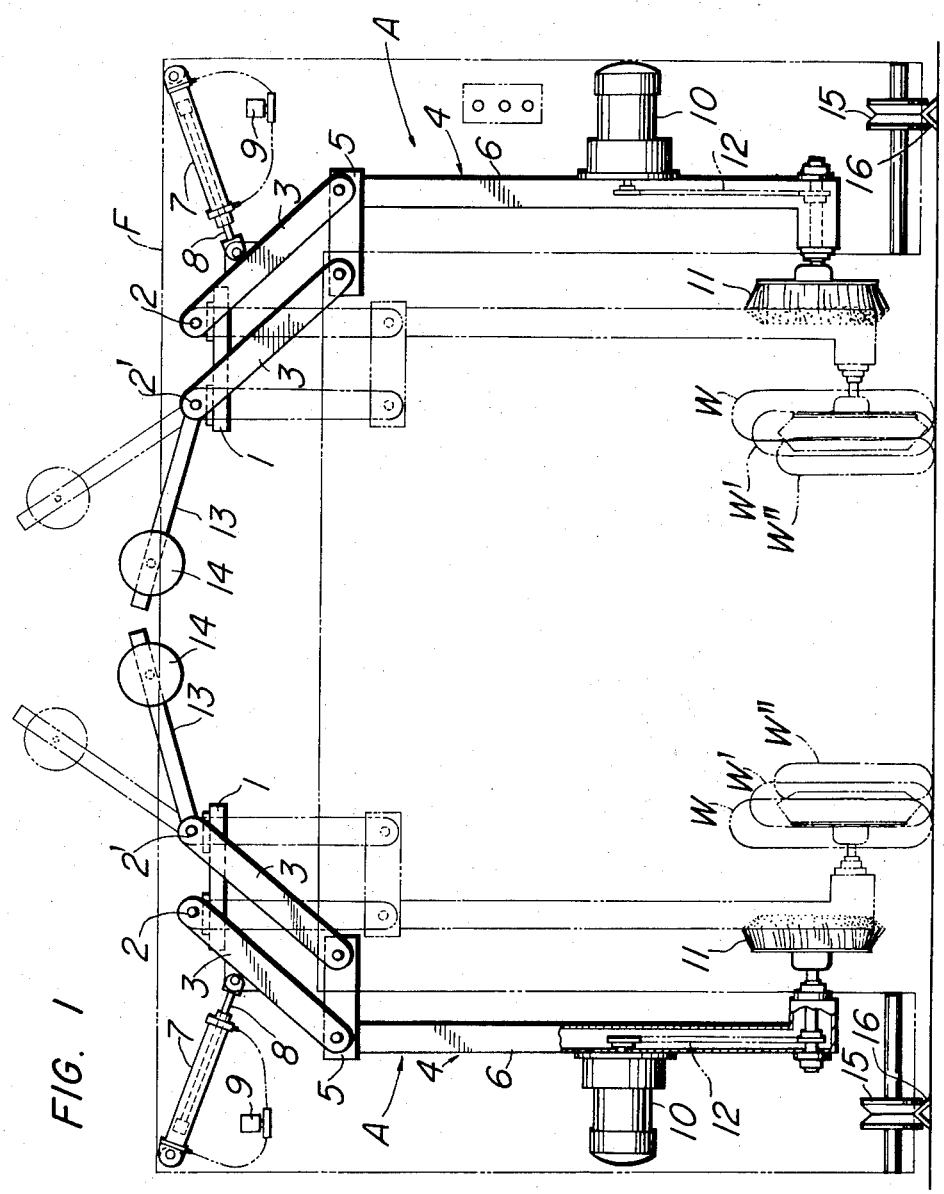

United States Patent [19]
Takeuchi

[11] 3,758,906
[45] Sept. 18, 1973

[54] CAR WASHING APPARATUS
[75] Inventor: Shigeo Takeuchi, Nagoya, Japan
[73] Assignee: Takeuchi Tekko Kabushiki Kaisha, Nagoya, Japan
[22] Filed: Apr. 30, 1971
[21] Appl. No.: 138,995

[30] Foreign Application Priority Data
June 3, 1970 Japan................................ 45/47181

[52] U.S. Cl. ............... 15/21 E, 15/DIG. 2, 15/21 C
[51] Int. Cl. ............................................. B60s 3/06
[58] Field of Search ....................... 15/DIG. 2, 21 D, 15/21 E, 21 R, 53, 21 C

[56] References Cited
UNITED STATES PATENTS
3,520,013  7/1970  Gougoulas .......................... 15/21 C
3,526,012  9/1970  Cirino ................................. 15/21 E

*Primary Examiner*—Edward L. Roberts
*Attorney*—Karl W. Flocks

[57] ABSTRACT

Car washing apparatus including brush means for washing the roof portion of a car, brush means for washing both sides of the car and brush means for washing outer side surfaces of wheels on the car, said last mentioned brush means being displaceable transversely and vertically in accordance with the size of the car.

4 Claims, 2 Drawing Figures

CAR WASHING APPARATUS

The present invention relates to a car washing apparatus and more particularly to an improvement in means for washing outer side surfaces of wheels on a car.

Such a car washing apparatus that includes brush means for washing the roof portion of a car, brush means for washing both side portions of the car and brush means for washing outer side surfaces of wheels on the car has widely been used. However, such a known apparatus is disadvantageous in that the brush means for washing the wheel outer side surfaces is not adjustable in the vertical position so that the center of the brush cannot always be aligned with the center of the wheel which is being washed. Thus, the known apparatus is not effective to wash the wheel outer surfaces.

The present invention has as an object to eliminate the above disadvantages.

Another object of the present invention is to provide a car washing apparatus for satisfactorily washing the outer surfaces of car wheels.

According to the present invention, there is provided a car washing apparatus including brush means for washing the roof portion of a car, brush means for washing both sides of the car, and brush means for washing outer side surfaces of wheels on the car characterized by the fact that said last mentioned brush means is translationally movable transversely and vertically in accordance with the size of the car so that the center of the brush can substantially be aligned with the center of the wheel being washed.

According to a preferred mode of the present invention, the car washing apparatus includes a gate type frame and at least one wheel washing brush rotatably supported on the frame at each side thereof. Each of the wheel washing brushes is supported by a parallel link mechanism carried on the frame, so that by applying a swing movement to said parallel link mechanism the brush can be translationally moved vertically and transversely. The brush is rotated by a suitable power source. The swing movement of the parallel link mechanism may preferably be controlled by a fluid pressure cylinder and the parallel link mechanism may be combined with weight means so that the weight may bias the link mechanism always in one direction.

The above and other features of the invention will become apparent from the following descriptions of an embodiment with reference to the accompanying drawings.

Figure 2:
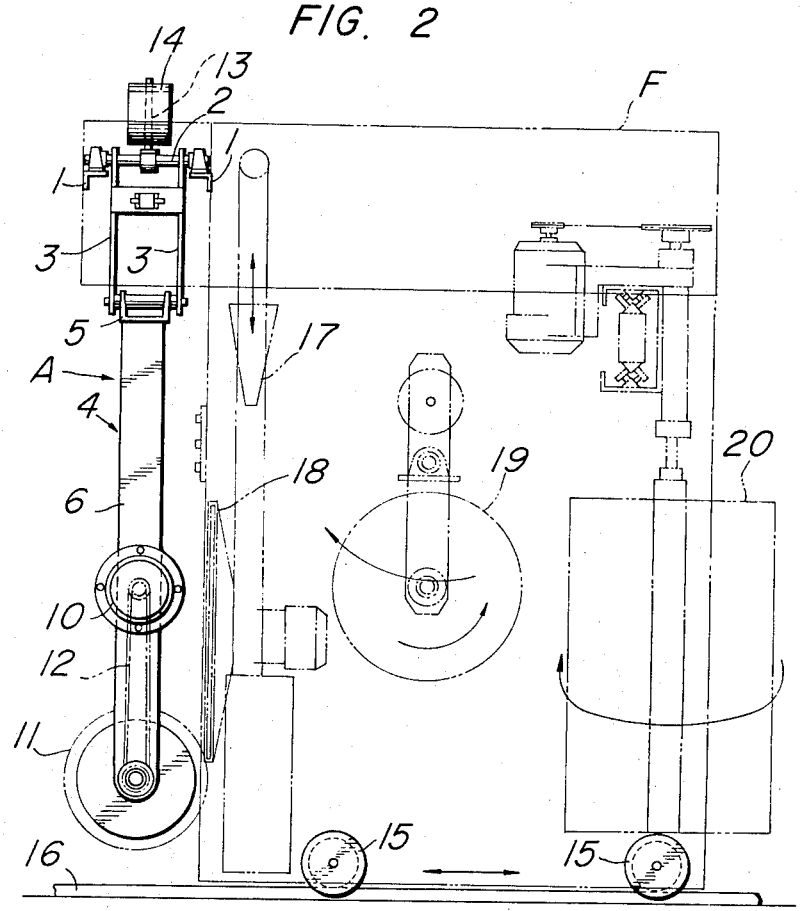

FIG. 1 is a front view of a car washing apparatus embodying the present invention; and FIG. 2 is a side view of the apparatus shown in FIG. 1.

Referring to the drawings, a car washing apparatus includes a gate type frame F shown by chain line in FIG. 1 and a pair of wheel outer side washing brush means A carried on the portions adjacent to the opposite ends of the upper horizontal member of the frame. These brush means are of identical structures so that only one of them will now be described.

On the upper horizontal member of the frame F, there is secured a horizontal bracket member 1 which rotatably carries a pair of shafts 2 and 2'. A pair of parallel link members 3 and 3' are secured at their upper ends to the shafts 2 and 2', respectively. The lower ends of the link members 3 and 3' are pivotally connected to a horizontal member 5 which is rigidly connected to the upper end of a vertical member 6. The horizontal member 5 and the vertical member 6 constitute an inverted L-shaped movable frame 4. An air cylinder 7 is pivotally connected at one end to the upper corner portion of the gate type frame F and at the free end of its piston rod 8 to the link member 3. Air pressure is supplied from a pressurized air source (not shown) through a three way valve 9 to the cylinder 7. A motor 10 is carried on the vertical member 6 of the L-shaped movable frame 4 and drives a brush 11 carried at the lower end of the member 6 through a power transmission means 12. Further, an arm 13 which carries a weight 14 at one end is secured to the shaft 2' at the other end, so that the washing brush means A is biased by the weight 14 to the outward position shown by the solid line in FIG. 1.

Wheels 15 are carried on the lower ends of the vertical members of the gate type frame F and roll on a pair of rails 16 disposed on the ground. Further, as shown in FIG. 2, car drier nozzles 17 and 18, a car roof washing brush 19 and side washing brushes 20 are carried on the gate type frame F.

In operation, a car to be washed is located between the rails 16, and the gate type frame F is moved along the rails 16 to perform washing. In order to wash wheels W, the brush 11 is placed at a position transversely outwardly of the wheel W and the air cylinder 7 is actuated to extend the piston rod 8, while rotating the brush 11 by the motor 10, so that the link members 3 and 3' are rotated clockwise against the action of the weight 14. Thus, the movable frame 4 is displaced inwardly and downwardly until it contacts with the outer side surface of the wheel W so as to wash it.

When the washing is finished, the air cylinder 7 is actuated in the reverse direction so as to rotate the link members 3 and 3' in the counterclockwise direction. Thus, the movable frame 4 is translationally moved transversely outwardly until it is retracted into the gate type frame F.

Generally speaking, cars vary in their wheel treads as well as in their wheel diameters as shown by W, W' and W'' in FIG. 2 as their sizes vary, however, according to the aforementioned embodiment of the invention, when the wheel tread and the tire diameter of the car to be washed are relatively small, the brush 11 is displaced inwardly and downwardly as shown by chain lines in FIG. 1. Thus, the brush 11 can be operated with respect to various sizes of cars with its axis substantially aligned with the center of wheel. Since the operation of the car drying nozzles 17 and 18 and that of the brushes 19 and 20 are similar to those of conventional apparatus, their detail will not be described. Although the air cylinder 7 is shown as a double acting type, it may be a single acting type with the weight 14 serving as a sole means for returning the brush means A.

The present invention has thus been described with reference to a particular embodiment illustrated in the drawings, however, it should be noted that the invention is not intended to be limited to the detail of the illustrated structures but several changes and modifications may be made without departing from the scope of the invention.

I Claim:

1. A car washing apparatus comprising brush means for washing the roof portion of a car, brush means for washing both side surfaces of the car, and brush means for washing the outer side surfaces of wheels on the car, characterized by the fact that the last mentioned brush means is carried translationally movably in transverse and vertical directions, and means is provided for causing a translational movement of the last mentioned brush means in transversely inward and downward direction with respect to a car having a small wheel tread and a small tire diameter, so that the axis of the brush is always substantially aligned with the center of the wheel.

2. A car washing apparatus in accordance with claim 1, which further comprises a gate type frame, and in which said brush means for washing the outer side surfaces of wheels include rotatable brushes disposed at least one at each side of said gate type frame, each of said rotatable brushes being carried through a parallel link mechanism supported at the upper end thereof on horizontally spaced points on the frame.

3. A car washing apparatus in accordance with claim 2, which further comprises a fluid pressure cylinder for causing a swing movement of the parallel link mechanism about its pivot points.

4. A car washing apparatus in accordance with claim 2, which further comprises weight means connected through an arm to said parallel link mechanism, the weight serving to bias said rotatable brush transversely outwardly.

* * * * *